(12) United States Patent
Hamilton

(10) Patent No.: US 8,166,214 B2
(45) Date of Patent: Apr. 24, 2012

(54) SHARED STORAGE FOR MULTI-THREADED ORDERED QUEUES IN AN INTERCONNECT

(75) Inventor: Stephen W. Hamilton, Pembroke Pines, FL (US)

(73) Assignee: Sonics, Inc., Milpitas, CA (US)

( * ) Notice: Subject to any disclaimer, the term of this patent is extended or adjusted under 35 U.S.C. 154(b) by 107 days.

(21) Appl. No.: 12/684,627

(22) Filed: Jan. 8, 2010

(65) Prior Publication Data

US 2010/0115196 A1    May 6, 2010

Related U.S. Application Data

(62) Division of application No. 11/757,248, filed on Jun. 1, 2007, now Pat. No. 7,814,243.

(51) Int. Cl.
*G06F 3/00* (2006.01)
*G06F 5/00* (2006.01)

(52) U.S. Cl. ............................. 710/52; 710/57

(58) Field of Classification Search ............... 710/52, 710/54, 57; 326/56; 709/234; 365/189.05; 711/118
See application file for complete search history.

(56) References Cited

U.S. PATENT DOCUMENTS

| | | | |
|---|---|---|---|
| 5,948,089 A | 9/1999 | Wingard et al. | |
| 5,999,435 A | 12/1999 | Henderson et al. | |
| 6,088,788 A | 7/2000 | Borkenhagen et al. | |
| 6,092,115 A * | 7/2000 | Choudhury et al. | 709/235 |
| 6,182,183 B1 | 1/2001 | Wingard et al. | |
| 6,330,225 B1 | 12/2001 | Weber et al. | |
| 6,331,961 B1 | 12/2001 | Kengeri et al. | |
| 6,578,117 B2 | 6/2003 | Weber | |
| 6,597,629 B1 | 7/2003 | Raszka et al. | |
| 6,606,317 B1 | 8/2003 | Beadle et al. | |
| 6,651,082 B1 * | 11/2003 | Kawase et al. | 718/105 |
| 6,683,474 B2 | 1/2004 | Ebert et al. | |
| 6,725,313 B1 | 4/2004 | Wingard et al. | |
| 6,779,089 B2 | 8/2004 | Lin et al. | |

(Continued)

FOREIGN PATENT DOCUMENTS

| | | |
|---|---|---|
| EP | 2156305 | 2/2010 |
| KR | 10-2009-7026779 | 5/2008 |
| WO | WO 2008/148132 | 12/2008 |

OTHER PUBLICATIONS

United States Patent and Trademark Office, "Class 710 Electrical Computers and Digital Data Processing Systems: Input/Output", Jan. 2009, 2 Pages.

(Continued)

*Primary Examiner* — Chun-Kuan Lee
*Assistant Examiner* — Farley Abad
(74) *Attorney, Agent, or Firm* — Rutan and Tucker, LLP

(57) ABSTRACT

In one embodiment, payload of multiple threads between intellectual property (IP) cores of an integrated circuit are transferred, by buffering the payload using a number of order queues. Each of the queues is guaranteed access to a minimum number of buffer entries that make up the queue. Each queue is assigned to a respective thread. A number of buffer entries that make up any queue is increased, above the minimum, by borrowing from a shared pool of unused buffer entries on a first-come, first-served basis. In another embodiment, an interconnect implements a content addressable memory (CAM) structure that is shared storage for a number of logical, multi-thread ordered queues that buffer requests and/or responses that are being routed between data processing elements coupled to the interconnect. Other embodiments are also described and claimed.

15 Claims, 9 Drawing Sheets

U.S. PATENT DOCUMENTS

| | | |
|---|---|---|
| 6,785,753 B2 | 8/2004 | Weber et al. |
| 6,804,738 B2 | 10/2004 | Weber |
| 6,804,757 B2 | 10/2004 | Weber |
| 6,804,815 B1 | 10/2004 | Kerr et al. |
| 6,961,834 B2 | 11/2005 | Weber |
| 6,988,186 B2 | 1/2006 | Eickemeyer et al. |
| 7,003,628 B1 * | 2/2006 | Wiedenman et al. ......... 711/118 |
| 7,046,686 B1 | 5/2006 | Tompkins et al. |
| 7,120,712 B2 | 10/2006 | Wingard et al. |
| 7,149,829 B2 | 12/2006 | Weber et al. |
| 7,165,094 B2 | 1/2007 | Weber et al. |
| 7,191,273 B2 | 3/2007 | Weber |
| 7,325,221 B1 | 1/2008 | Wingard et al. |
| 2003/0140196 A1 | 7/2003 | Wolrich et al. |
| 2006/0004956 A1 | 1/2006 | Madajczak |
| 2006/0195663 A1 | 8/2006 | Arndt et al. |
| 2007/0124728 A1 | 5/2007 | Rosenbluth et al. |
| 2008/0183926 A1 | 7/2008 | Wingard et al. |
| 2008/0301708 A1 | 12/2008 | Hamilton |

OTHER PUBLICATIONS

"Content-addressable memory," http://web.archive.org/web/20060913000000/en.wikipedia.org/wiki/Content-addressable_memory, Sep. 13, 2006, 2 pages.

International Search Report and Written Opinion, PCT/US2008/065430, mailed Jul. 21, 2008, 7 pages.

International Preliminary Report on Patentability, PCT/US2008/065430, mailed Dec. 10, 2009, 7 pages.

Non-Final Office Action for U.S. Appl. No. 11/757,248 mailed Dec. 10, 2009, 18 pages.

Non-Final Office Action for U.S. Appl. No. 11/757,248 mailed Aug. 5, 2009, 15 pages.

Non-Final Office Action for U.S. Appl. No. 11/757,248 mailed Feb. 18, 2009, 14 pages.

Requirement for Restriction/Election Office Action for U.S. Appl. No. 11/757,248 mailed Oct. 29, 2008, 8 pages.

* cited by examiner

US 8,166,214 B2

SHARED STORAGE FOR MULTI-THREADED ORDERED QUEUES IN AN INTERCONNECT

RELATED APPLICATIONS

This application is a divisional of and claims the benefit of U.S. patent application Ser. No. 11/757,248, titled "SHARED STORAGE FOR MULTI-THREADED ORDERED QUEUES IN AN INTERCONNECT," filed Jun. 1, 2007.

An embodiment of the invention relates to the use of ordered queues within an interconnect that enables communication between multiple processing elements of a system on a chip. Other embodiments are also described.

BACKGROUND

Traditionally, an interconnect implements a separate, dedicated ordered queue structure, such as a first-in first-out buffer (FIFO), for each thread. Requests from an initiator core in a given thread are written to an associated FIFO at its tail, while previously stored requests are read from the FIFO at its head (and then forwarded to their target cores). While a thread may go quiet (but does not end its execution), its FIFO becomes empty and then will remain unused and available for use by that thread.

SUMMARY OF AN EMBODIMENT OF THE INVENTION

In one embodiment, payload of multiple threads between intellectual property (IP) cores of an integrated circuit are transferred, by buffering the payload using a number of order queues. Each of the queues is guaranteed access to a minimum number of buffer entries that make up the queue. Each queue is assigned to a respective thread. A number of buffer entries that make up any queue is increased, above the minimum, by borrowing from a shared pool of unused buffer entries on a first-come, first-served basis. In another embodiment, an interconnect implements a content addressable memory (CAM) structure that is shared storage for a number of logical, multi-thread ordered queues that buffer requests and/or responses that are being routed between data processing elements coupled to the interconnect. Other embodiments are also described and claimed.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
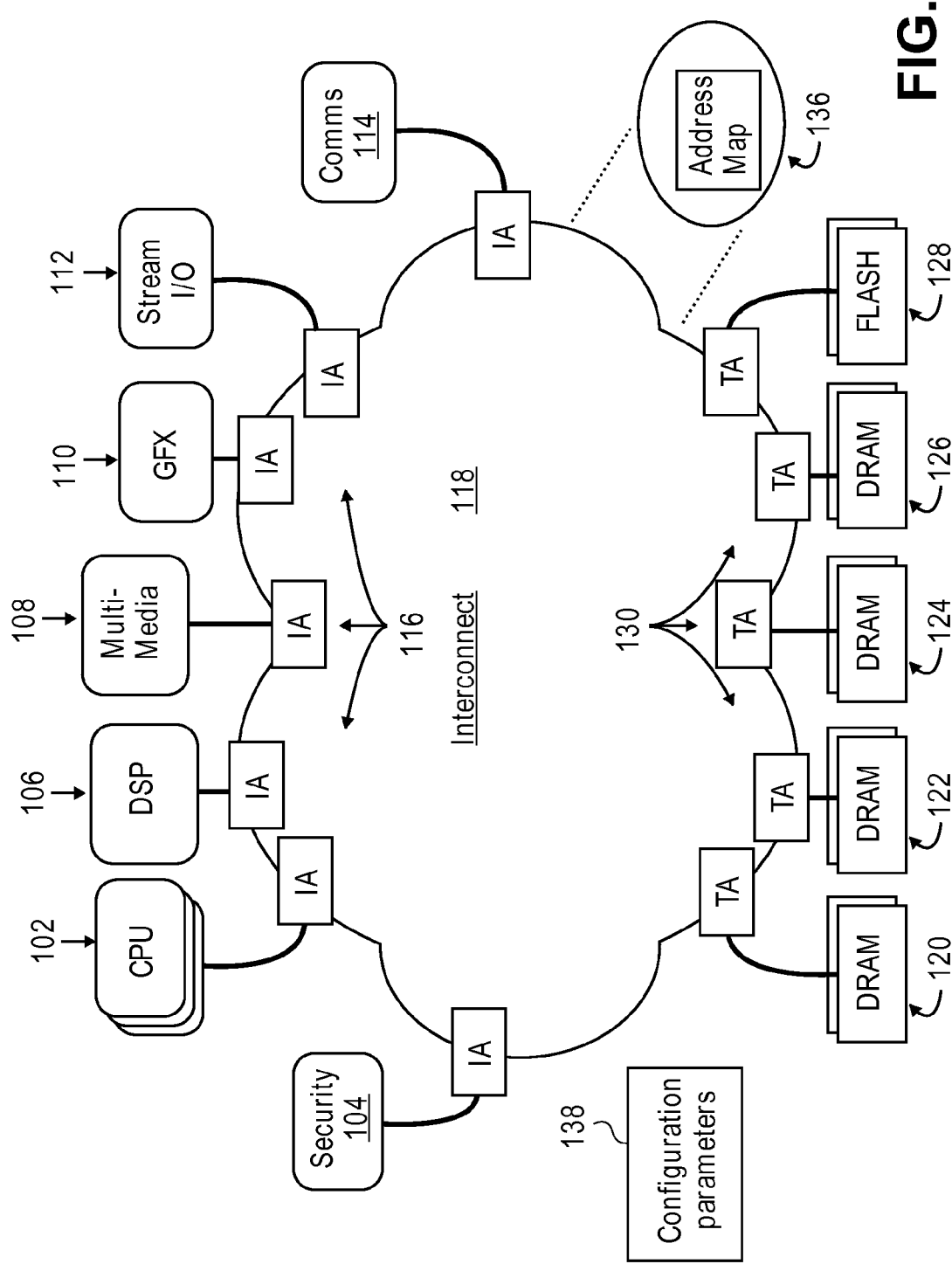
FIG. 1 is a block diagram of an integrated circuit in which an embodiment may be implemented.

An embodiment of the invention is a multi-threaded shared storage (MTSS) non-blocking ordered queue for use in an interconnect. Another embodiment of the invention is directed to a solution in which the write and read ports of the ordered queue are in separate clock domains-referred to here as an asynchronous multi-threaded (MT) ordered queue.

An interconnect, also referred to here as an interconnect fabric or a bus fabric, provides a means for processing elements (cores) of an integrated circuit to communicate with each other at high speed. Each core may have different operating speeds, bandwidth capabilities and signaling requirements but may use a similar protocol to interface with the interconnect. The interconnect serves to provide the needed translation between the cores communicating with each other. For instance, one of the elements may be a data processor whose interface to the interconnect is in accordance with the Advanced Microcontroller Bus Architecture (AMBA) which is a widely used, on-chip bus for Advanced RISC Machine, or Acorn RISC Machine, (ARM) processors. See, e.g. AMBA 2.0 Specification. Another may be a processor that performs other specialized tasks and that may be connected to the interconnect via a different interface, such as the Open Core Protocol International Partnership (OCP-IP). See, e.g. OCP 2.2 Specification. A further processing element that is connected to the interconnect may be a memory subsystem in which external dynamic random access memory (DRAM) is provided for use by some or all of the connected cores. Vendors currently provide semiconductor Intellectual Property (IP) cores for use in manufacturing such processing elements as part of a system-on-a-chip (SoC) design.

To enable efficient development of products based on the SoC design, the semiconductor IP provider Sonics, Inc. of Mountain View, Calif., is continuing to advance the technology of interconnects to meet the SoC requirements of the future. The advanced interconnect design should be such that it need not be substantially reengineered for each derivative product. For instance, there are advanced interconnect fabrics that are non-blocking, to better support SoC models that contain several complex cores and heterogeneous processing elements (in contrast to a processor-centric SoC model). Such an advanced interconnect design should balance bandwidth and latency for communications between the cores.

Current SoC designs allow these multiple cores to execute in parallel. That is, there are separate threads of execution that are dependent upon or synchronized with each other at only very large time intervals. As these separate processing threads emit communications from initiator cores and directed at target cores, the results in the interconnect are separate streams of communication transactions. These are called communication threads. If several of these communication threads involve a common resource, such as emitting from a common core or targeting a common core, then the interconnect component needs to introduce synchronization dependencies between the multiple streams. Otherwise, it is desirable for performance reasons to maintain the independence of the communication streams. To that end the interconnect has ordered queues (e.g., FIFOs) whose buffering function helps reduce the likelihood that any given thread from a connected core will be blocked from executing a thread through the interconnect. Each FIFO has a separate data word storage which is randomly addressable, and maintains access pointers to sequence those addresses. The dedicated FIFO must contain a sufficient amount of storage space or entries (depth) needed to satisfy the performance goals for its associated thread.

In an embodiment, a thread can be thought of as a stream of data coming from a source such as a single application or single processing unit within a device, and moreover multiple threads from that single source may be in progress at any given time. A thread can run independently and/or simultaneously along with other threads from that single source to accomplish a task. A processing thread is an ordered sequence of instructions. A communications thread may comprise an ordered sequence of transactions. A transaction is a set (across phases) of defined and ordered transfers. A thread may thus be an ordered sequence of transfers. Generally, a process thread (in an initiator) generates a communication thread.

FIG. 1 is a block diagram of an integrated circuit design in which an embodiment may be implemented. Any reference here to a circuit design, interconnect design, system design, or an IP core is understood to also mean the actual circuit or core that has been manufactured based on the design. There are several example IP cores that are coupled to an interconnect 118 as part of the integrated circuit or system. In general, an IP core may act as an initiator to issue requests, or as a target that issues responses, over the interconnect 118. In the example of FIG. 1, there is a central processing unit (CPU) IP core 102, a security IP core 104 that may be dedicated to perform security functions such as encryption and authentication, a digital signal processor (DSP) IP core 106 that accelerates certain signal processing tasks, a multimedia IP core 108 that specializes in processing multimedia data structures, a graphics IP core 110 that specializes in graphics signal processing, a streaming I/O IP core 112 which specializes in forming data streams, and a communications IP core 114 which acts as an interface to communicate with devices or components that are external to the integrated circuit (e.g., a wireless communications interface). Each of these cores may be considered to be an initiator, and it is connected to the interconnect 118 by way of its respective, initiator agent interface (IA) 116.

In addition to the initiator IP cores, the interconnect 118 has one or more target IP cores (cores that are targets of transactions that proceed through the interconnect 118). In this example, a memory subsystem is shown as having one or more DRAM IP cores 120-126 and may also have a flash memory IP core 128, all connected to the interconnect via their respective target agent interfaces (TA) 130. Each DRAM IP core 120-126 may have an associated memory scheduler and a DRAM controller (not shown) to facilitate their respective memory read and write transactions. It should be noted that the number of IP cores and their respective functionalities depicted in FIG. 1 is only an example, as other integrated circuit environments that have different combinations of IP cores connected to the interconnect 118 are possible.

The interconnect 118 may use synchronous, multi-threaded (or multi-tagged), time-multiplexed interfaces (e.g., a AMBA, OCP, etc.). These may be capable of only one transfer per clock cycle. That transfer may be associated with any thread (or tag). It is thus time-multiplexed—a set of threads share the interface by waiting their turn. All threads can be active at a slow rate of progress, or one thread can be active at a peak rate, or any combination between these two extremes—e.g., three active at $\frac{1}{3}^{rd}$ rate.

The IP cores and the interconnect 118 may have self-contained and pre-designed functionality developed by a provider such as Sonics, Inc. of Mountain View, Calif. These can be used as macro functions for the system. For example, the interconnect 118 implements an address map 136 with assigned addresses for targets and initiators in the system, and serves to route requests and responses between the cores as part of transactions and threads. An address generator may be part of each IA 116 and TA 130, to translate the assigned logical addresses in the address map 136 into physical addresses of the IP cores that make up the system. Configuration parameters 138 for the interconnect 118 may be set to suit a particular integrated circuit or SoC application.

The interconnect 118 in effect provides a shared communications bus between the IP cores of the system. The interconnect 118 may be implemented as a combination of hardware and software such as adapters or other logical modules that facilitate address-mapped and arbitrated communication between the IP cores 102-114, 120-128. The interconnect 118 may be implemented entirely on the same IC die as the IP cores (referred to as an SoC), or it may be part of a multi-chip IC package that makes up a System-in-a-Package (SiP).

The interconnect 118 may be pipelined (with flow control logic that implements a pipelined protocol), with buffering functionality to store and move requests and responses in stages through the integrated circuit. The interconnect 118 may have flow control logic that is non-blocking with respect to requests from another thread that is executing in the integrated circuit.

Some interconnect technologies call for the use of a separate, dedicated FIFO for each operating thread. This means that the block of storage in a FIFO must contain sufficient room to satisfy the performance goals for the associated thread. A problem occurs when the thread has periods of time during which it is less active, such that many of the entries in its associated FIFO remain unused. The result for the interconnect as a whole is that although the FIFO blocks have enough entries to support the maximum performance on all operating threads at once, this is a waste of resources because in most systems it is not possible for all of the threads, which an interconnect can support, to be active at their maximum performance, all at the same time.

An interconnect may be designed and operated such that while it transfers payload of multiple threads between a number of IP cores that are connected to it, the payload is buffered using a number of order queues. Each thread has its own queue, but the number of buffer entries (also referred to here as buffers or storage cells) that make up the queue are managed dynamically. Each of the order queues is guaranteed access to a minimum number of buffer entries. At any one point in time, each queue entry is for use by the thread that is assigned to it, and not others. The number of buffer entries that make up any one of the queues is increased, above the minimum, by borrowing from a shared pool of unused buffer entries on a first come, first served basis. As will be explained below, using an example, such a dynamic solution requires fewer total buffer entries to provide the same performance. Thus, the queue entries in the pool are shared by all threads. While each thread is guaranteed access to a minimum number of entries, the remaining entries in the pool are shared by all threads on a first come, first served basis. Note that since the interfaces to the interconnect 118, for example IA 116 and TA 130, see FIG. 1, prevent all threads from being active at once, i.e. transferring in the same cycle, this allows the usage of the queue entries to follow the same pattern as the use of the interfaces, without limiting performance. Each core can be running multiple threads with different thread IDs.

Note that each entry in the shared pool of buffer entries may be viewed as a memory block that is not statically allocated to a given order queue. In effect, the size of the queue changes while its associated thread is operating, borrowing from and returning entries as needed to the shared pool. In an example embodiment described below, the order queues are FIFOs. Also, each of the order queues may have the same, minimum number of buffer entries. Alternatively, some of the ordered queues could have a different, minimum number of buffer entries.

Figure 2A:
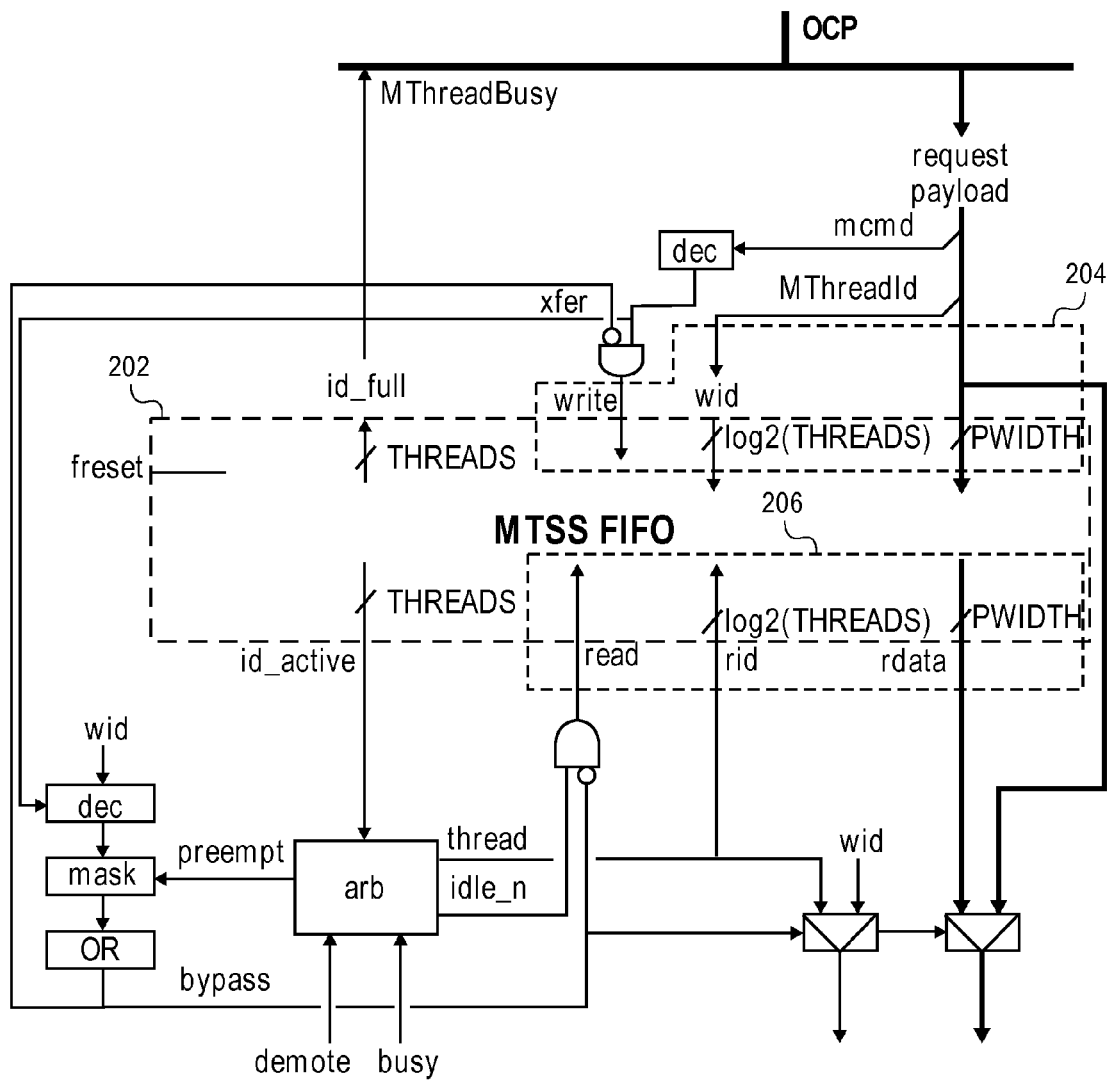
FIG. 2A depicts an example use of a multi-thread shared storage (MTSS) FIFO in bypassable fashion, in the context of an OCP Request phase.

In an embodiment, the interconnect implements a content addressable memory (CAM) structure that is shared storage for a number of logically parallel thread queues (e.g., a multi-thread shared storage, MTSS, FIFO). The MTSS FIFO buffers the requests and/or responses routed between the IP cores by the interconnect 118. The interconnect implements the CAM as shared storage for this multitude of thread buffers. The CAM stores requests that are from two or more threads that may come from one or more of the initiator IP cores and that are to be routed to a target IP core in the integrated circuit. The shared CAM has CAM entries formed from combined data word storage and pointer management functions. Before delving into the details of an example CAM structure, FIG. 2A depicts an example use of an MTSS FIFO in a bypassable fashion. The MTSS FIFO permits a multiple word storage block to be shared by two or more thread FIFOs. A thread FIFO is a logical FIFO that has been assigned to or associated with a particular operating thread.

An attribute of multi-threaded FIFOs is their inter-thread blocking behavior. If one thread fails to drain out entries on its read port while the write port continues to write on that thread, then the FIFO accumulates entries on that thread until it goes full. If a second thread is able to process entries through the FIFO while the first thread is full, then the FIFO is said to be non-blocking. Otherwise it is said to be blocking. A blocking FIFO is generally undesirable because it allows one stopped process (on the SoC) to block all concurrent processes. This lowers the average number of processes operating concurrently, which is directly related to the performance achieved by the device system. In the example here, shown in FIG. 2A, the total amount of storage in the MTSS FIFO may be specified, and a portion of the storage can be allocated to each thread's associated FIFO. If the sum of all the allocations exceeds the total store size, then some inter-thread-blocking may occur.

The MTSS FIFO 202 has a write port 204 through which payload requests (including write data) are received, in this case from an OCP interface at an initiator agent of the interconnect 118. A thread ID (wid) is also received that is associated with the request payload, identifying to which thread the request belongs. The write port also has an output thread busy signal (id_full) where a bit per thread is asserted to stall the interface, preventing it from presenting additional requests for that thread, if the FIFO associated with the thread is full (e.g., the maximum number of entries have been allocated to the FIFO and all of the entries are in use, in that they are storing previous requests).

The MTSS FIFO 202 also has a read port 206 that provides payload data that has been pulled from the head of a FIFO (rdata). This read data is then transferred "downstream" by the interconnect to another one of its interfaces, in accordance with the instructions in the payload. The MTSS FIFO also provides an indication of which threads are active, that is which threads have payload available to be output from the head of their respective queues (id_active). The interconnect 118 uses this active status, together with status regarding downstream resources (busy) in an arbitration block (arb) which then specifies which thread FIFO to read (thread). The interconnect 118 presents this selection to MTSS (rid) and asserts a signal (read) when it is ready to pull the read data (payload) from the FIFO.

Figure 2B:
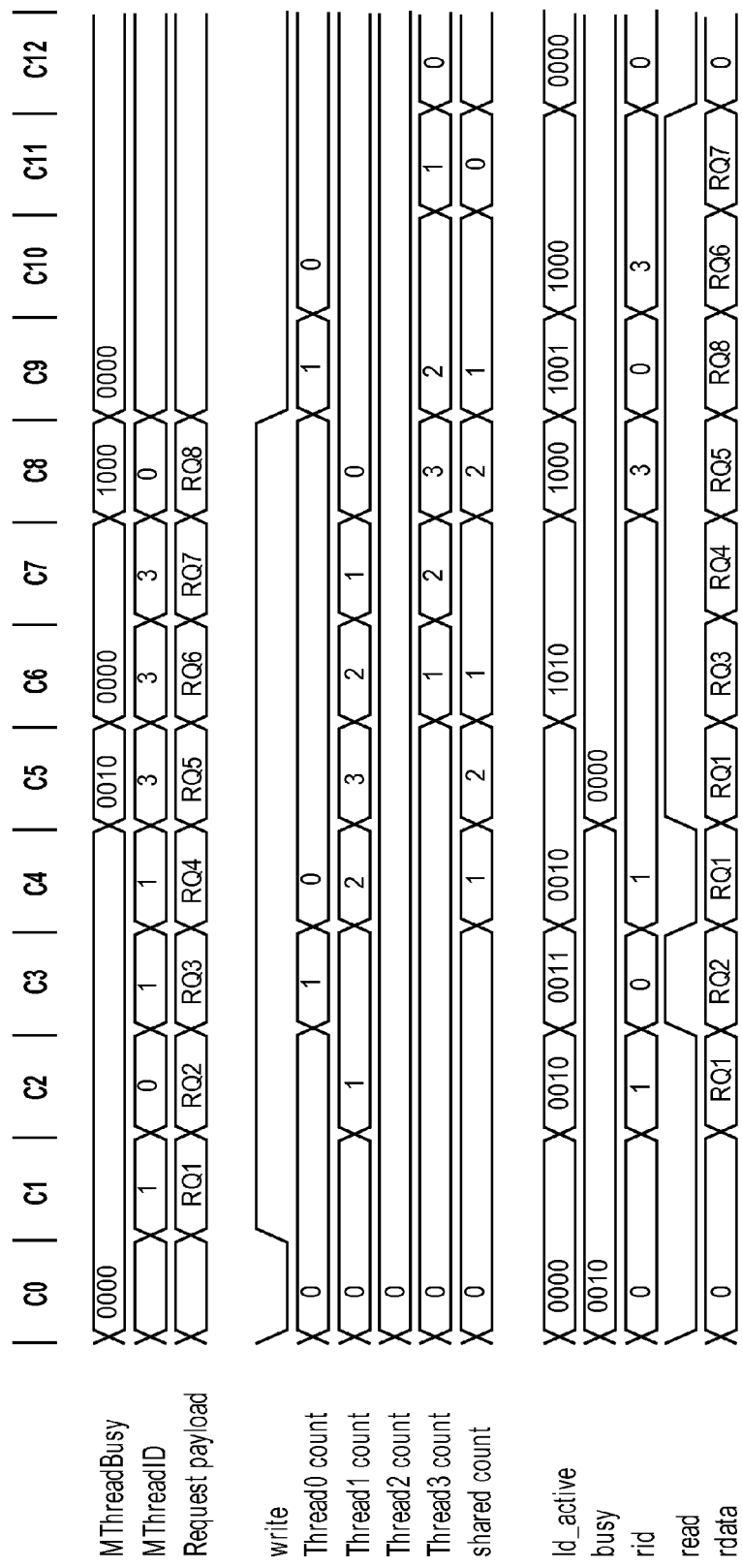
FIG. 2B shows a sequence of operations that could occur on the MTSS FIFO of FIG. 2A.

FIG. 2B shows a sequence of operations that might occur on the mechanism of FIG. 2A. It is assumed (for this example only) that the MTSS FIFO in FIG. 2A is configured to have seven entries in total, with one entry allocated to each of the four threads in the OCP, and three entries available for sharing. Each thread is permitted a maximum usage of three entries. Initially, in cycles C0 through C4, the resources downstream of the MTSS FIFO are busy on thread 1. A burst of activity occurs on the OCP request phase in cycles C1 thru C8. The MThreadID field identifies the thread for each request written to the MTSS. In cycle C1 the first request is written, on thread 1, causing the internal counter for thread 1 to advance from 0 to 1 in cycle C2. Note that the id_active field reflect the fact that the count value is not zero in that cycle. It is assumed that the arb block uses a strict priority with thread 0 as the highest priority and thread 3 as the lowest. So it selects thread 1 in cycle C2. However, since thread 1 is busy, the read signal is not asserted. RQ2 on thread 0 is written in that cycle, advancing the thread 0 counter at the next clock edge. The thread 0 bit in id_active is asserted in cycle C3, and the arbiter selects thread 0 and performs a read from MTSS. This causes the thread 0 counter to decrement to 0 at the next clock edge, removing the 0 bit from id_active and thread 0 from arbitration in cycle C4.

In cycles C3 and C4 additional requests on thread 1 are written. The thread 1 counter reflects this by incrementing to 2 and 3. Since each thread is allocated only a single entry, these two requests are stored in shared MTSS entries. The shared entry counter is incremented to track these allocations. Because the max allocation for all threads is set to 3, the thread 1 FIFO is full as a result of the write in C4 (note while thread 1 is selected for read in that cycle, it is still busy so no read occurs). To prevent further writes to thread 1 MThreadBusy is asserted on bit 1. As a result the OCP master switches and begins sending requests on thread 3 starting in cycle C5. Meanwhile the downstream resources on thread 1 become free, allowing the arbiter to begin draining the thread 1 FIFO starting in that C5 cycle.

At the clock edge to start C6 the thread 1 counter decrements to 2, which deasserts the MThreadBusy bit for the thread. This permits additional writes on thread 1, but in the case shown the master elects to continue offering requests on thread 3 for awhile. In C6 when the second request is written on thread 3, that thread has now exceeded it minimum allocation, and so uses a shared entry. It is possible that this entry was just released by thread 1 in a previous cycle. The thread 3 bit in id_active is asserted in cycle C6, but the arbiter continues to favor thread 1 until that FIFO is emptied in cycle C8. The arbiter then switches to draining FIFO 3, except for a 1 cycle interruption in C9. In C8 the last write occurs on thread 0, so the arbiter drains that entry in C9. The above sequences of operation thus illustrate the MTSS mechanism at work, although other sequences of operation are possible.

Figure 3:
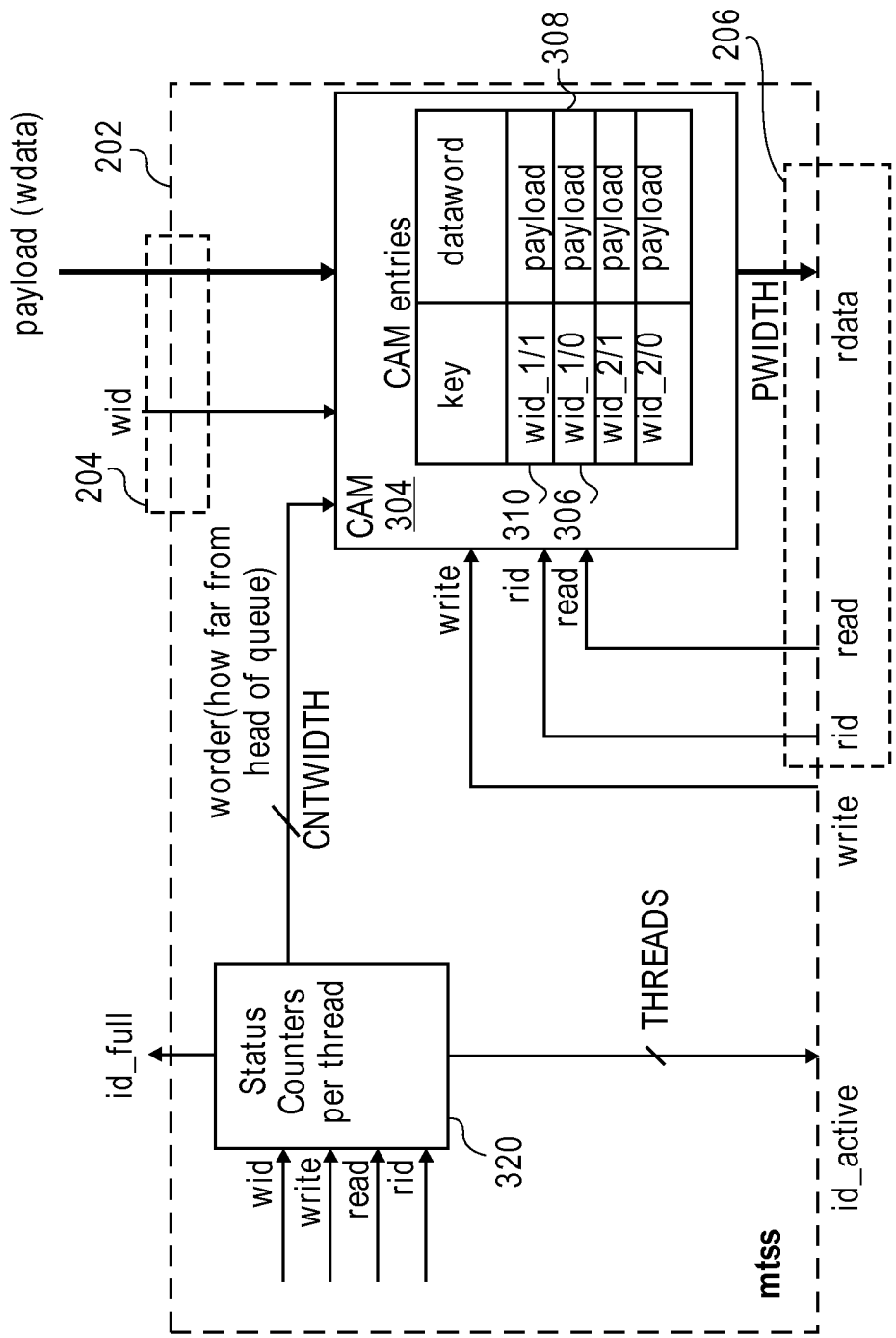
FIG. 3 is a block diagram of how the MTSS FIFO 202 may be implemented using a CAM structure, in accordance with an embodiment.

Turn now to FIG. 3, a block diagram of how the MTSS FIFO 202 may be implemented by a CAM is shown, in accordance with an embodiment. CAM block (or CAM store)

304 may be a conventional CAM that has been modified as follows. The CAM block 304 has a number of CAM entries, where each entry includes logic gates and storage circuitry for a single buffer entry. Each entry has a valid field which indicates whether or not the entry is in use (i.e., has been assigned to a thread or FIFO.) Each entry stores a key and a data word. The key has at least a first field which identifies a FIFO and an associated thread (wid) to which the entry is currently assigned. The data word contains a portion of a buffered request or response in the associated thread, e.g. a single word of request or response payload, to be stored and retrieved in a content addressable fashion. The data word may be coupled with the key to form a pair of information to be stored as an entry in the CAM through the write port.

The CAM block 304 may be a collection of storage locations with an index (sometimes called a key) portion and a data word portion. Each entry has comparison logic to determine if an incoming key value from a read port 206 matches the stored key value for that entry. The CAM block 304 may be managed so that all stored key values are unique. This guarantees that at most one entry matches any accessed key. The data word for the matched entry is output. Thus the CAM block 304 outputs the data portion for the entry that matches the requested key value—content (of the key field) addressable memory.

The CAM block 304 may be managed in such a way that at most one out of all of the valid CAM entries in the CAM block 304 matches any accessed key value. This is achieved, in accordance with an embodiment, by making the key be a combination of the first field and a second field that represents how many other entries precede this entry, in queue order, for the thread FIFO. For example, referring still to FIG. 3, consider thread wid_1. A thread FIFO has been assigned to this thread in the CAM block 304 as shown, with two valid entries. The /0 entry is at the head of the queue for this thread, and the subsequent /1 entry is next in line. Accordingly, if the interconnect 118 seeks to read from the head of the queue assigned to thread wid_1, a key value would need to be generated that combines wid_1 and the value of a counter that keeps track of the queue as it is written and read, to effectively point to the right CAM entry. The CAM creates a local order of requests in a thread being stored in the CAM, on a per thread basis.

To read the head of the queue (associated with thread wid_1), the combination wid_1/0 is generated as an accessed key value. This key value should match only entry 306, depicted in FIG. 3. The value in the data word field 308 becomes the output of the matching entry. The field 308 contains the payload of a request or response in the thread, and that was written earlier into the FIFO. After the match, the entry associated with fields 306, 308 is then invalidated and thereby becomes available for reuse, either by the queue associated with wid_1 or by a queue associated with a different thread. Counter logic will now update the next entry, and in particular its key field 310, changing it from wid$_{-1}$/1 to wid_1/0 (i.e., that entry is now at the head of the queue). In this example approach, the input key, produced in the write port of CAM block 304 for each combination of a received wid and write order (worder), is simply a concatenation of the two fields. As an alternative, the key may be defined differently as long as it identifies a particular entry of a particular buffer, separate from all others stored in the CAM block 304. The same technique may be used at the read port of the MTSS FIFO 202, to generate an accessed key that is supplied to the CAM block 304.

What follows is a more detailed description of an MTSS FIFO, in accordance with an embodiment, beginning with an example CAM entry followed by a description of other logic blocks that enable the functionality described above.

Referring to FIG. 2 and FIG. 3, the MTSS FIFO 202 is configurable in the payload width (PWIDTH), and the number of threads that it can support (THREADS). In addition, the total number of storage locations or entries (BUFFERS) may also be configurable. The allocation for each thread is also configurable (MAX_CNT[t]).

The MTSS FIFO may be configured as a non-blocking multi-threaded FIFO, by assigning BUFFERS to be equal to the sum of all MAX_CNTs, for all threads. Alternatively, it may be configured as a statistically non-blocking multi-threaded FIFO by assigning BUFFERS to be greater than the largest of all MAX_CNTs for all threads and larger than the sum of all MIN CNTs for all threads. In this case, a full FIFO may slow progress through other FIFOs under statistically rare cases, but may never halt progress on other FIFOs. Finally, MTSS FIFO may be configured as a blocking multi-threaded FIFO by assigning BUFFERS to be less than MAX_CNT, for at least one thread, or less than THREADS.

The MTSS FIFO may provide a FIFO busy status (fifo_full), on a per thread basis. The MTSS write port will accept the payload or write data to be written, the thread the payload is associated with, and a write control signal. The MTSS may also provide on a per thread basis a not empty signal (id_active) and a FIFO not empty (fifo_active) status output. The MTSS read port refers to the thread to read from, a read control signal, and the payload that is read.

Figure 4:
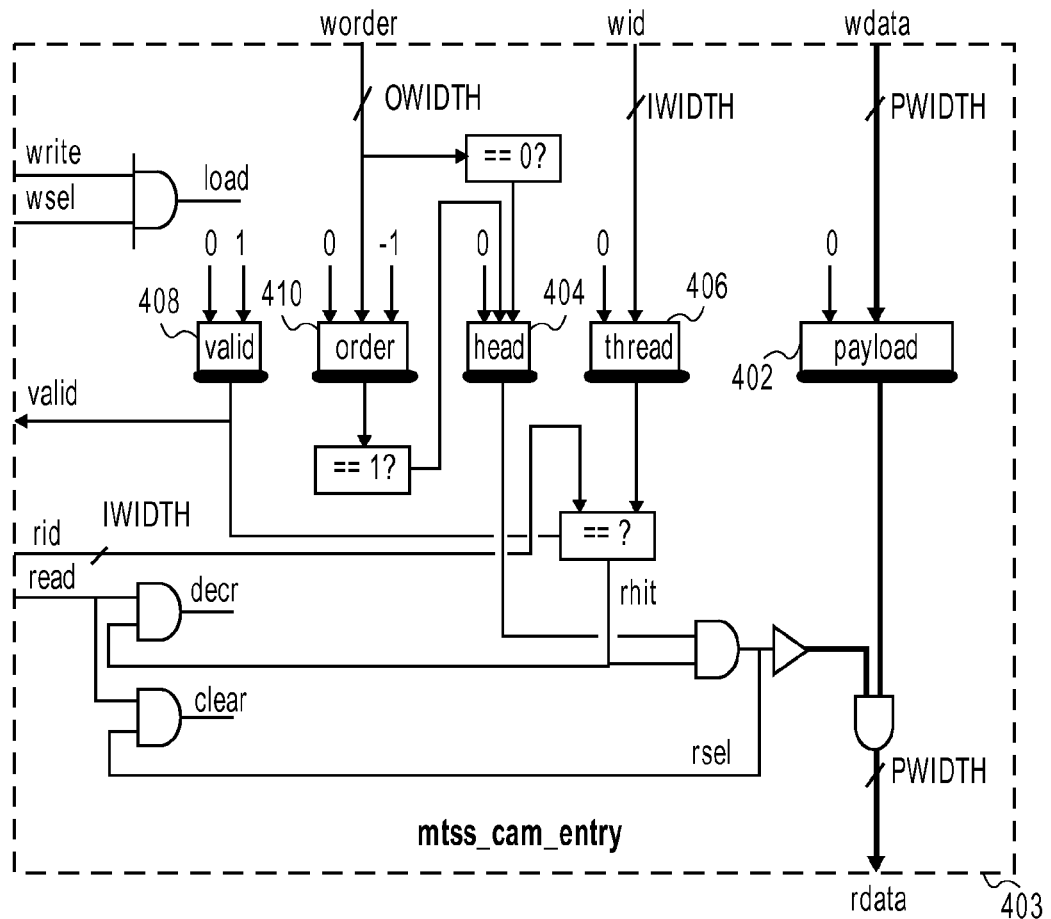
FIG. 4 is a logic diagram of a CAM entry, according to a preferred embodiment of the invention, that includes hardware for dynamically establishing the value of the CAM key.

Turning now to FIG. 4, a logic diagram of an example CAM entry 403 that is part of the CAM block 304 is shown. The CAM entry (or CAM cell) 403 permits a single word of payload to be stored and retrieved in a content addressable fashion. There is a valid register 408 which indicates whether the entry holds a valid, stored word or not. A payload register 402 stores the payload or write data. Since the content of the payload register 402 is associated with a thread, a thread register 406 is provided to store this association. Also, because multiple entries in a particular thread FIFO may contain payload associated with the same thread, an order register 410 is provided to store the place this particular entry holds in the FIFO order, for the associated thread. A head register 404 is provided to indicate whether the entry is at the head of the thread FIFO with which it is associated.

The CAM entry 403 is loaded when both write and wsel inputs are asserted. This asserts the valid register 408 and loads the payload register 402 from the write data input (wdata). The thread register 406 is also loaded from the thread id input vector (wid). The order register 410 is loaded with worder (see FIG. 6 for how this signal can be generated). The head register 404 is loaded appropriately, based on the value of worder. In particular, if worder is 0, then head is set to 1 indicating that the entry is at the head of the queue. Otherwise, head is set to 0. This results in the thread FIFO being written to its tail.

An access operation is performed upon the CAM entry 403 by placing a thread number on the read input (rid). If the CAM entry is valid and the thread register 406 contains the same value as indicated by rid, then a read hit is indicated. If the entry is also at the head of the FIFO order for the associated thread (head==1), then the entry is selected for read (rsel==1). When the entry is selected to be read, the contents of its payload register 402 are presented on the read data output (rdata). This results in the thread FIFO being read from its head.

A read operation is performed if the read input is asserted, and the value on the rid input results in a read hit. If head is asserted, a read operation sets both head and valid to 0. If head is not asserted, a read operation sets head to 1 if the order register 410 contains the value 1. If head is deasserted, a read operation decrements the value in the order register 410. This logic arrangement within each CAM entry dynamically establishes the value of the CAM key, as the FIFO associated with this entry is read. This logic arrangement within each CAM entry dynamically establishes the local order of requests within a given thread stored in the CAM. The order block may indicate a local order of requests within a thread, in this shared storage queue at the current time. The value can be initially determined based on the number of requests stored in the CAM for that thread ID, at the time when the request is written as an entry into the CAM, and can later be dynamically changed as read accesses for that thread occur. The head block may provide a look ahead function to determine proximity in time from head of queue for requests in a given thread.

The CAM key may be created internally, and may comprise two fields. The first field is a thread number to identify which FIFO the entry is currently assigned to. The second field is an order number that represents how many other entries precede this entry in the FIFO order for the same FIFO. An external (to the CAM) counter can maintain this value (and is shared for efficiency with the credit based flow control logic for the FIFO). The first field is static for the duration the entry is valid. The thread number is assigned when the entry is written, and does not change as long as the entry is in use.

The CAM entries are designed with extract logic, so that the second field is dynamic. The extra logic in this example includes both a decrementer, and a second partial key comparator. Each time a preceding entry in the same FIFO is read from the CAM (detected by the partial key comparator), the field is decremented. This means there is exactly one entry at any point in time for each FIFO that is at the head of that FIFO. This is the entry (matched by the normal entry key comparator) that is output when that thread is accessed from the CAM. When the entry is output it is invalidated and becomes available for re-use by the same or a different FIFO.

A benefit of this scheme is that read access may occur faster because the data word payload for a matching read access is already loaded at the head of queue and only a receipt of an rsel signal for that thread is needed for the data word to be sent out the rdata read port.

Note, similar hardware may exist to establish the order for responses, in an ordered queue on the response flow control side of the interconnect.

Figure 5:
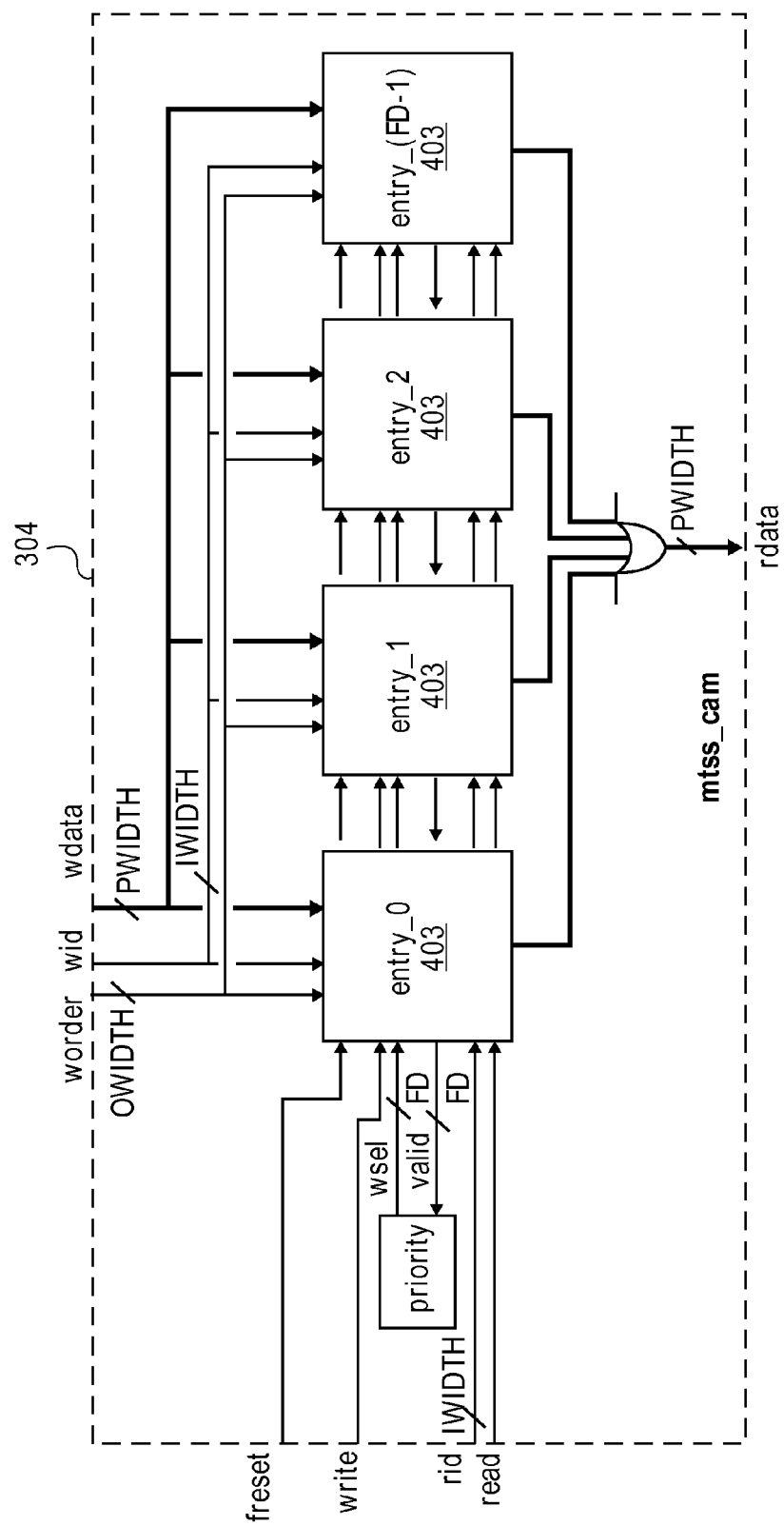
FIG. 5 is a block diagram of a CAM store (CAM block), to illustrate how the CAM store logically implements multiple thread FIFOS.

Turning now to FIG. 5, a detailed view of the CAM block 304 is provided, showing a collection of CAM entries 0, 1, . . . FD-1. The view in FIG. 5 depicts a CAM store in which multiple words of payload are stored. Each payload word has an order or position within its thread stream. The words are retrieved in a thread addressable fashion. In the example given here, the storage order obeys the FIFO rule. The CAM store may be configured with the number of words of storage (FD), the width of the payload (PWIDTH), the width of the thread IDs (IWIDTH), and the width of the order vectors (OWIDTH). Here, FD and BUFFERS represent the "size" of the MTSS FIFO as a whole. Each storage location within the CAM store is an instance of the CAM entry 403. The write data (wdata), write ID (wid), and write order (worder) input vectors are sent to all entries in parallel. The read ID (rid) input vector, and read command bit are likewise sent to all entries in parallel.

Each entry generates a single valid signal, and these are collected into an internal, valid vector. Using a priority encoder, when all entries are full, wsel is all deasserted, so that no entry is selected for writing. Should additional writes be indicated at the write port (called overwrites), they are ignored. When not all entries are full, wsel will select exactly one of the entries that are not valid, so that overwrite of a valid entry will not occur.

When an entry is to be written, the worder input should reflect the number of valid entries associated with that thread. So, for example, if worder is 1, then there is only one valid entry in that thread. If this requirement is met, then all entries associated with a thread will have unique order values, and these values will represent the access order. Specifically, only one valid entry associated with each thread will have an order value of 0. This means that if the value on rid is a thread for which valid entries exist, then the single entry that is associated with that thread and that has an order value of 0 will be output on rdata, from the entry. All other entries will output all 0s on rdata. In other words, when a thread has been identified to be read, only the payload word at the head of the FIFO associated with that thread is presented at the output of the CAM block. This is achieved by the CAM store performing a simple OR of rdata from all entries, and outputting the result. If rid selects a thread for which there is no valid entry, then rdata outputs all 0s.

If read is asserted, the entry with an order value of 0 (at the head of the FIFO) is invalidated. All other entries associated with the thread value on rid will have their order values decremented. If the worder entry property mentioned above is followed, this read decrement will select a new unique entry with a 0 order value.

Figure 6:
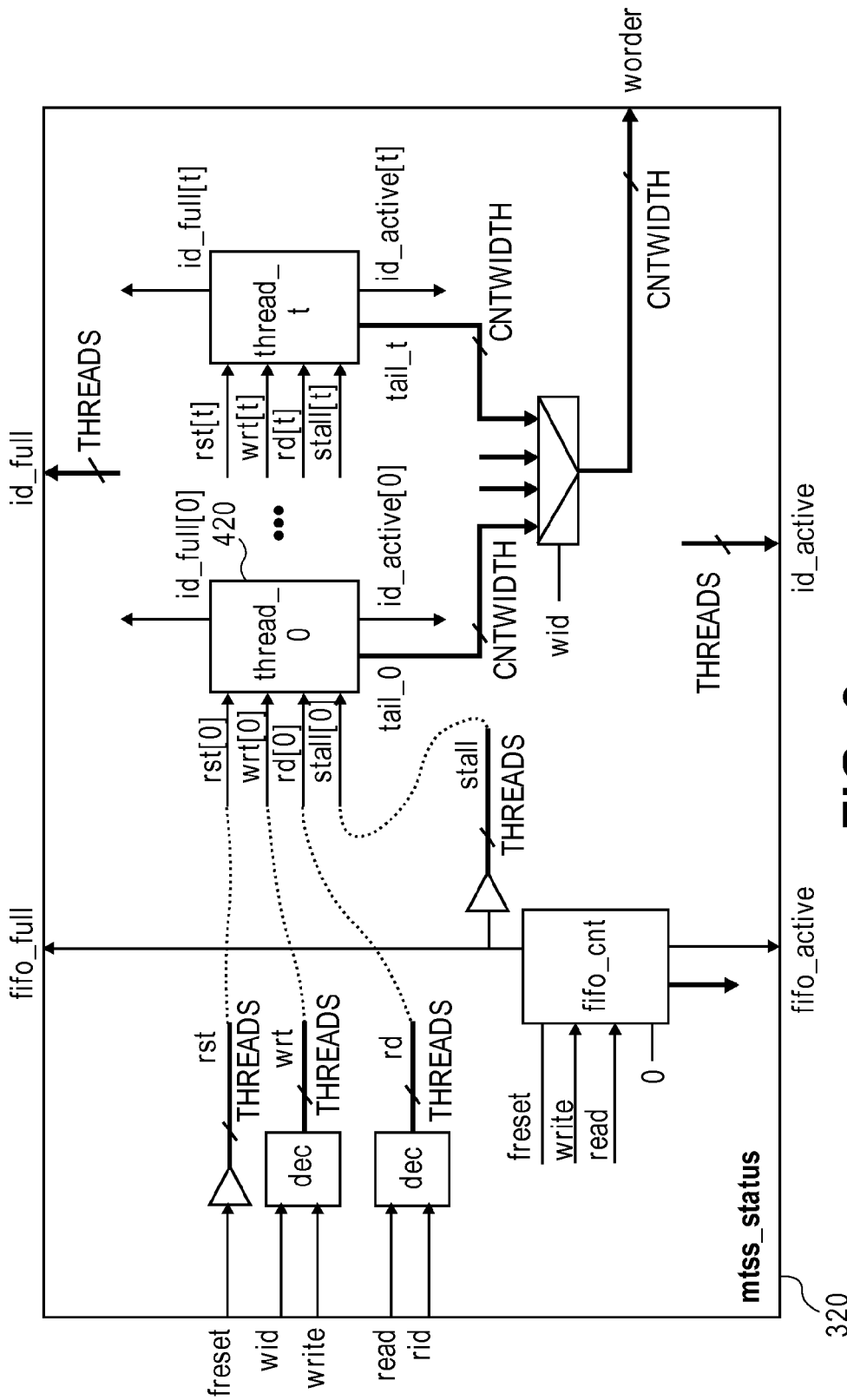
FIG. 6 depicts internal details of the MTSS status block, in accordance an embodiment, in which a single counter is used to establish local sequence order of requests and/or responses in a given thread.

Referring now to FIG. 6, this is a block diagram of the status block 320 (see FIG. 3). The status block 320 maintains a count of valid entries for each thread, and for the MTSS FIFO as a whole. The block 320 provides worder values that maintain FIFO order for each thread. The block 320 is configurable with respect to the number of threads (THREADS), and the thread ID widths (IWIDTH). There is a single status counter cell 420 for each thread. The FIFO depth per thread is given by MAX_CNT.

Each counter cell 420 (associated with a thread) provides a single bit in id_full and id_active status outputs. The wid input vector is decoded and enabled by the write input, to produce a THREADS bit 0-1-hot wrt vector. One bit is connected to each status counter cell 420. Similarly, rid input vector is decoded and enabled by the read input to produce a THREADS bit 0-1-hot rd vector. One bit is connected to each status counter cell 420. A separate instance of the cell status counter is created for the MTSS FIFO as a whole (fifo_cnt). The status output from that instance of the counter is fanned out to the stall inputs in all of the other (per thread) status counter instances. This way, if the MTSS FIFO as a whole ever becomes full, all THREADS will indicate full.

When a thread is selected for writing by wid, the status block 320 outputs on worder the current, tail value for that thread.

With the above description in place for the elements of an example embodiment of the MTSS FIFO, an example sequence of operations for the MTSS FIFO will now be given. Following a reset, all status counters will have tail values of 0, and be not active and not full. All entries will be not valid. The rdata output will be all 0s regardless of the rid value.

Since no thread is full at this time, any thread may be presented for write (wid) when an input payload becomes valid (write). The status block 320 will specify worder=0 for the selected thread, and the payload, selected thread, and worder will be loaded into the single, write selected entry in the CAM block 304. The tail counter for the selected thread will be incremented to 1, causing the id_active bit for that thread to be asserted.

Next, assume that the interconnect 118 has an arbitrator that acts upon the id_active vector, and selects a winning thread to present out of the MTSS FIFO. The winning thread is indicated to the MTSS FIFO on rid. This causes rdata to output the valid head entry for that thread. If this output payload is accepted downstream of the MTSS FIFO, this is indicated by asserting read. At that point, the tail counter for the selected thread in the MTSS FIFO will be decremented. Also, the valid head entry for that thread will be invalidated. If this was the last CAM entry associated with the read selected thread, the tail counter for that thread will be decremented to 0, causing the active bit for that thread to be deasserted. This should eliminate the thread from further access from downstream arbitration.

When entries in the MTSS FIFO are written, the worder that is generated in the CAM block is sourced from the tail counter for the thread, and that counter is then incremented. This is repeated as subsequent entries that are associated with the same thread are written. This means that the valid CAM entries for a thread may always have the consecutive worder numbers, in this example, 0, 1, 2, . . . N. When a CAM entry for the thread is read, all entries for the thread have their worder values decremented, and the worder=0 entry is invalidated. This preserves the consecutive worder numbers 0, 1, 2, . . . N−1. The tail counter is also decremented on read, so that it tracks with the largest number valid in the CAM block. The CAM entry with worder=0 is marked as the head of its associated FIFO, and is sourced as rdata for the thread. Thus, FIFO access is maintained by the MTSS for multiple threads at once.

It should be noted that the above-described example embodiment is relatively efficient and provides the MTSS FIFO with relatively quick response to FIFO read and write requests. An alternative, less optimal solution would be to implement the MTSS FIFO, in particular, its CAM block 304, using separate head and tail counters for each thread, and a look-up table that for an input thread vector (e.g., rid) would point to the CAM entry that is at the head of the requested thread FIFO. Although this is in principal a more straightforward solution, it is expected to not only be slower but also more logic gate intensive than the example embodiment described above in connection with FIGS. 3-6.

Referring back to FIG. 6, in an embodiment, all entries for the space in a CAM can be shared by all threads coming to that CAM, on a first come first served basis. Counter logic may determine when the number of requests indicated by all of the individual thread counters equals or exceeds a set value for the CAM, and then outputs a signal indicating that the CAM is full and sends a thread busy signal back to the component sending the incoming request. In an embodiment, the CAM guarantees access to a minimum number of entries for each thread assigned to a queue, as well as additional entries filling the remaining space in the queue that can actually be shared by all threads on a first come first served basis. The counter for that thread may also have a minimum guaranteed value set for that thread, and each thread counter may then output a signal when the number of stored requests are equal to or exceed the minimum guaranteed value set for that thread. In this embodiment, both the signal indicating a maximum number of valid entries for the entire CAM has been meet, and the signal indicating that the minimum guaranteed number of valid entries has been met (for that thread) have to be asserted, before a thread busy signal is sent in response to an incoming request for that thread.

A benefit of the shared storage, multi-threaded ordered queue design described above can be illustrated by the following example. Let P be a block implementing multi-threaded non-blocking FIFOs using another technology. Let N be a block implementing multi-threaded non-blocking FIFOs used in an embodiment. Assume that both blocks implement T FIFOs. Each FIFO has a minimum size min_size(t) needed in order to guarantee peak burst rates for that FIFO. Each FIFO has a maximum size max_size(t) needed in order to guarantee sufficient decoupling of the input and output processes associated with that thread FIFO. Assume that both blocks P and N implement the same min_size(t) and max_size(t) values for all T FIFOs.

Compare the implementation sizes of blocks P and N. A first order comparison of the gate counts for implementation can be provided by examining the total number of storage entries that will be needed. This approximation assumes that the cost per entry is roughly the same for P and N. As long as the number of FIFOs (T) and the largest max_size(t) are reasonably small numbers, then the payload size of the entries will dominate, and this assumption will hold.

Block P implements T separate single threaded FIFOs in parallel. Each FIFO is large enough to hold max_size(t) entries. So the total number of entries for block P will be the sum of max_size(t) across all T FIFOs.

$$P\_entries = max\_size(0) + max\_size(1) + max\_size(2) + \ldots + max\_size(T-1) \quad (1)$$

Block N implements a single shared storage CAM. There are enough entries so that min_size(t) can be satisfied on all T FIFOs simultaneously. There are additional entries so that any one of the FIFOs can be active and fully decoupled.

$$N\_peak = min\_size(0) + min\_size(1) + min\_size(2) + \ldots + min\_size(T-1) \quad (2)$$

$$N\_decouple = MAX(max\_size(0) - min\_size(0), \ldots, max\_size(T-1) - min\_size(T-1)) \quad (3)$$

$$N\_entries = N\_peak + N\_decouple \quad (4)$$

It should be clear that N_entries is less than P_entries. For 1 FIFO the N block has min_size(t) for peak and max_size(t)−min_size(t) for decoupling. So it has max_size(t) entries for that FIFO, which is the same number as block P has. For all other FIFOs, block N has min_size(t) entries while block P has max_size(t) entries. If max_size(t)>min_size(t) for any of these FIFOs then block N will have fewer entries than block P.

We can see a simple example by assuming symmetry among the threads. Consider an 8 threaded block (T=8); where each thread has 1 entry to assure no inter-thread blocking (min_size(t)=1 for all t); and where each thread needs 2 entries to maintain full peak bandwidth (max_size(t)=2 for all t).

$$P\_entries = T * max\_size(t) = 8 * 2 = 16 \text{ entries} \quad (5)$$

$$N\_entries = (T * min\_size(t)) + (max\_size(t) - min\_size(t)) = (8*1) + (2-1) = 9 \text{ entries} \quad (6)$$

Block N is 62.5% of the size of block P in this simple but common case. This embodiment of the invention has reduced the implementation cost to 62.5% of its former value. Thus, the shared multiple threaded non-blocking order queue lowers the implementation cost (gates and area) of the multi-threaded non-blocking FIFO function and simplifies performance optimization.

Asynchronous Multi-Threaded FIFO

An embodiment implements an asynchronous multi-threaded FIFO as a series of two FIFOs. The first FIFO in the series is a single threaded asynchronous FIFO. The second FIFO in the series is a synchronous multi-threaded FIFO.

A benefit of the series approach is that the implementation cost of a multi-threaded synchronous FIFO is much smaller than the cost of a multi-threaded asynchronous FIFO. So enough gates are saved by implementing the multi-threaded FIFO with a synchronous implementation to offset the cost of the extra FIFO at the front in the series (since it is single threaded).

Figure 7:
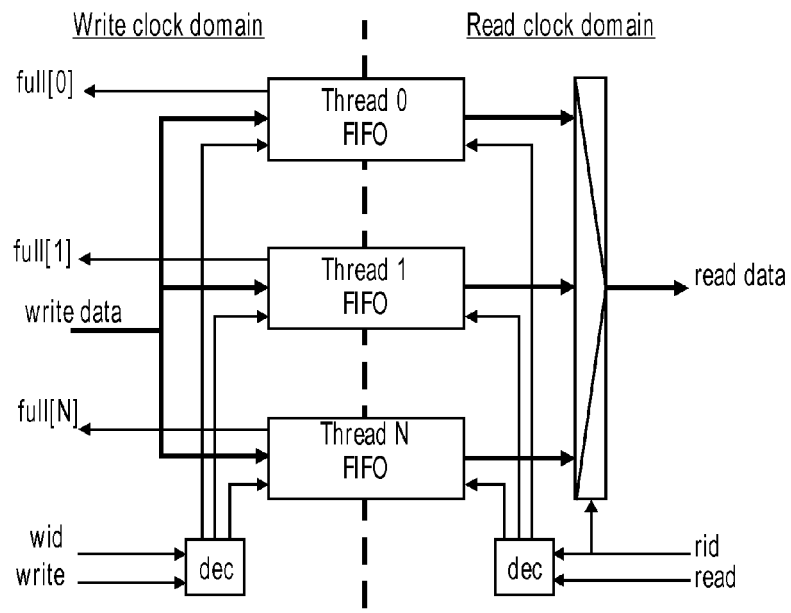
FIG. 7 is a block diagram of an asynchronous multi-threaded (MT) FIFO.
Figure 8:
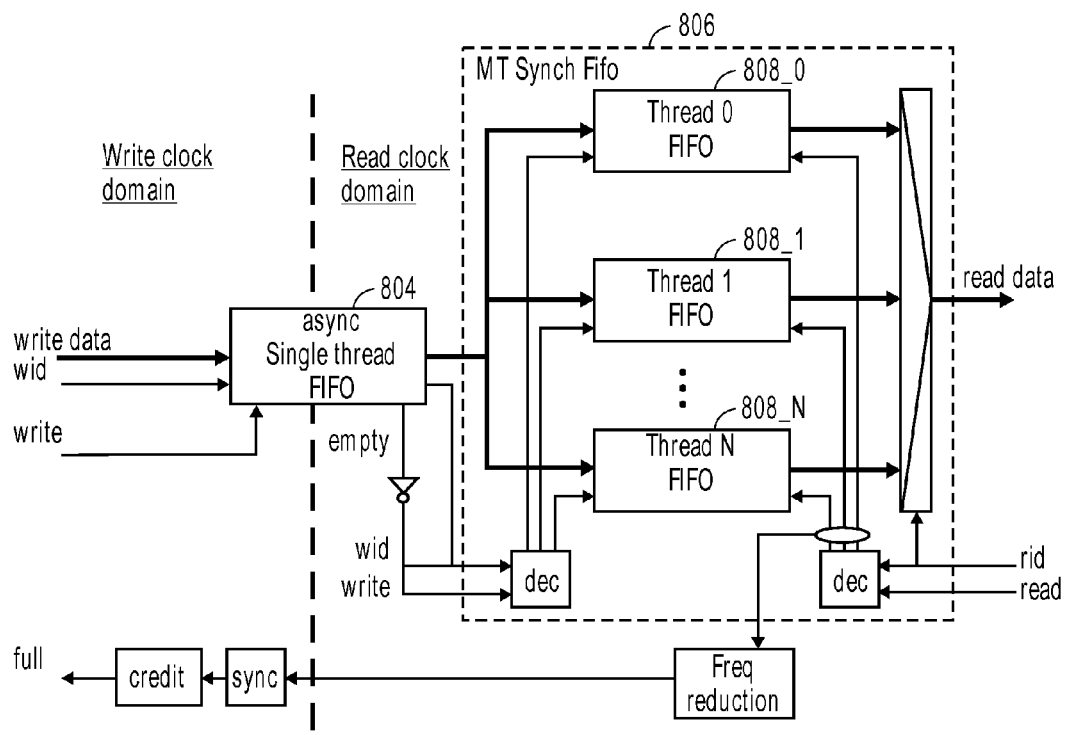
FIG. 8 is a block diagram of an asynchronous MT FIFO, in accordance with an embodiment.

Referring now to FIG. 7, this drawing shows an implementation of a multi-threaded asynchronous FIFO. In contrast, FIG. 8 shows another being a multi-threaded asynchronous FIFO, with two stages. Note, the dashed box is a synchronous multi-threaded FIFO portion 806 composed of N+1 single thread FIFOs 808, rather than an asynchronous multi-threaded FIFO.

Note how the traditional implementation in FIG. 7 is directly non-blocking, since it implements separate FIFOs in parallel for each thread. If one of them is full, parallel paths still exist for the other threads.

The organization of the two stage FIFO in FIG. 8 creates the potential for blocking behavior. The single threaded asynchronous FIFO 804 is a common point in the path for all threads. If a thread in the multi-threaded synchronous FIFO portion 806 is full, and a new entry for that thread is written into the asynchronous single threaded FIFO 804, that entry will not be able to proceed. Entries written into the asynchronous single threaded FIFO 804 behind the blocked entry, will not be able to proceed until the blocked entry proceeds.

In order to avoid this blocking behavior, an embodiment prevents writing an entry into the single threaded asynchronous FIFO 804 unless it is known that there is space available in the multi-threaded synchronous FIFO portion 806 to store it. Therefore, the two stage MT FIFO of FIG. 8 as a whole will never block. A technique used to guarantee this property is called credit based flow control. A block of logic in the write clock domain manages the credits and generates the write port full status for each thread.

The credit based flow control maintains a counter for each thread. The counter is initialized with the number of available entries for the thread in the multi-threaded synchronous FIFO portion 806. Each time an entry for the thread is written into the single threaded asynchronous FIFO 804, the counter value for that thread is decremented. When the counter value goes to 0, the thread is indicated as full, so that no further entries on the thread will be presented. As each entry for the thread is read from the block, the read command is sent from the read clock domain to the write clock domain and synchronized. It is then used to increment the thread credit counter (allocate a new credit).

A benefit of the shared storage solution described above is also apparent in the setting of an asynchronous MT FIFO, which can be appreciated by the following discussion. In cases where the write and read ports of a multi-threaded FIFO are in separate clock domains—the so called asynchronous multi-threaded FIFO—it is interesting to note that the asynchronous crossing lengthens the flow control loop for management of FIFO pointers. As a result max_size(t) numbers tend to grow if full peak bandwidth potential is to be maintained. Where traditional double rank synchronization is used for managing metastability at the asynchronous boundary, and where the clock rate ratio between the ports is not constrained, a max_size(t) of 6 may be needed to assure the crossing FIFO does not limit bandwidth.

In this case, an embodiment of the invention creates an asynchronous multi-threaded non-blocking FIFO as a sequence of 2 FIFOs. The first in the sequence is a traditional single threaded FIFO, large enough (e.g., max_size(t)=6) to assure full rates no matter what clock ratio. The second FIFO is a synchronous version of an embodiment of the MTSS FIFO described above. Credit based flow control is used across the asynchronous boundary to assure that the single threaded crossing FIFO preferably never blocks the crossing. There is always room for its entries to drain into the second FIFO.

Consider the same 8 threaded FIFO previously described, but now consider it in the asynchronous use case. Since max_size(t) has grown, the size of P has grown significantly.

$$P\_entries = T*max\_size(t) = 8*6 = 48 \text{ entries} \qquad (7)$$

The size of the synchronous shared storage FIFO is calculated in the same manner as calculated in the previous example, but N_decouple now reflects the bigger max_size(t) value. Additionally, the single threaded asynchronous FIFO has 6 additional entries.

$$N\_entries = N\_peak + N\_decouple + crossing = 8+1+6 = 15 \text{ entries} \qquad (8)$$

Block N is 39.6% of the size of block P in this new and common case. This embodiment has reduced the implementation cost to 39.6% of its former value without compromising performance.

EDA Toolset

Figure 9:
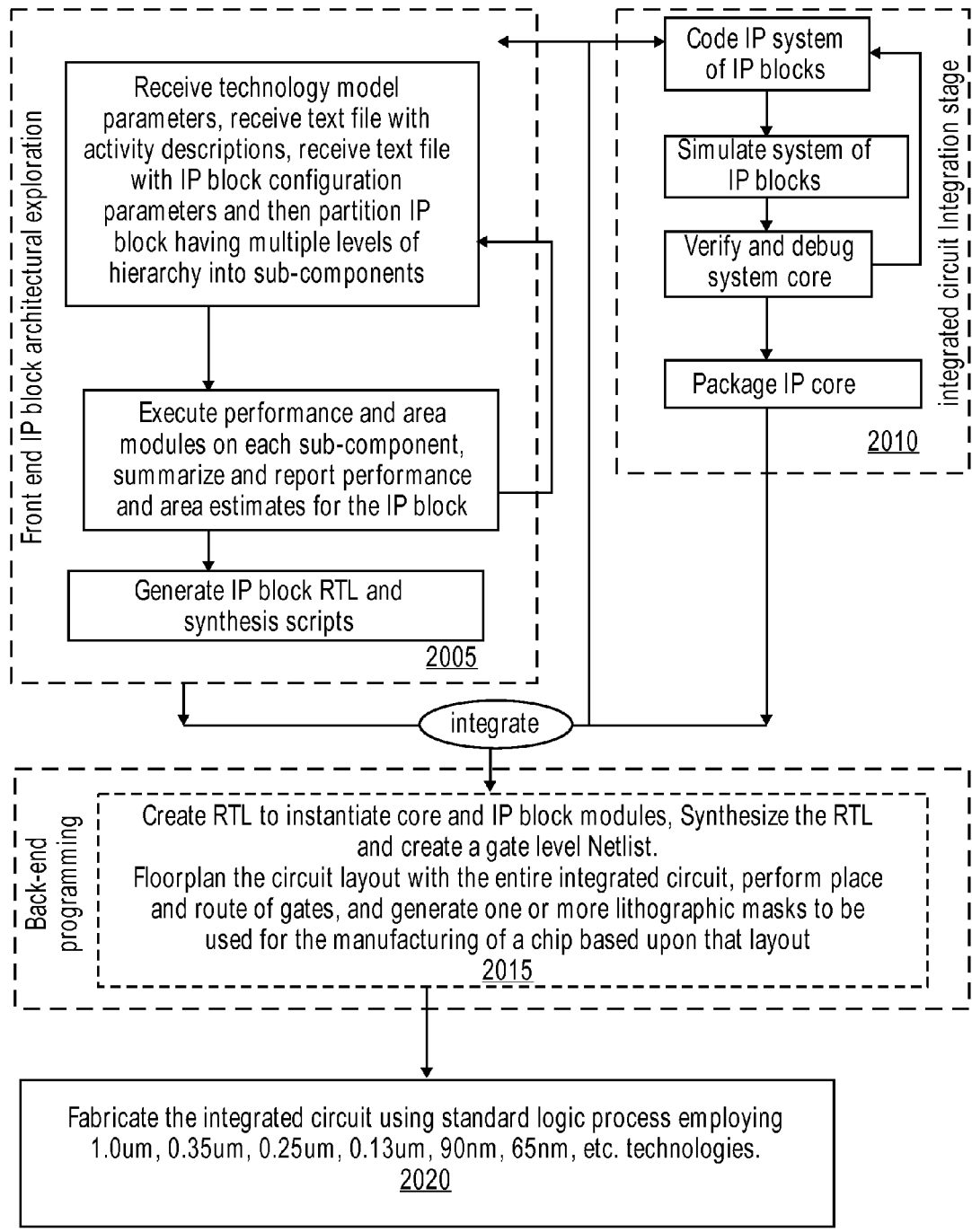
FIG. 9 is a flow diagram of a design and manufacturing process for integrated circuits.

FIG. 9 illustrates a flow diagram of an example process for creating a device, such as a SoC, with the designs and concepts discussed above for the interconnect. The process may utilize an electronic circuit design generator, such as a SoC compiler, that is part of an Electronic Design Automation (EDA) toolset. Hardware logic, coded software, and a combination of both may be used to implement the following design process steps using an embodiment of the EDA toolset. The EDA toolset may be a single tool or a compilation of two or more discrete tools. The information representing the components and/or process operations for the circuitry in the interconnect, may be contained in a cell library, soft instructions in an electronic circuit design generator, within a machine-readable storage medium storing this information.

Aspects of the above design may be part of a software library containing a set of designs for components making up the interconnect and associated parts. The library cells are developed in accordance with industry standards. The library of files containing design elements may be a stand-alone program by itself as well as part of the EDA toolset.

An example EDA toolset may comprise the following: a graphic user interface; a common set of processing elements; and a library of files containing design elements representing circuits, control logic, and cell arrays. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SoC design: front-end processing and back-end programming.

Front-end processing includes the design and architecture stages, which includes design of the SoC schematic. The front-end processing may include connecting models, configuration of the design, simulating, testing, and tuning of the design during the architectural exploration. The design is typically simulated and tested. Front-end processing traditionally includes simulation of the circuits within the SoC and verification that they should work correctly. The tested and verified components then may be stored as part of a stand-alone library or part of the IP blocks on a chip. The front-end views support documentation, simulation, debugging, and testing.

In block 2005, the EDA tool set may receive a user-supplied text file having data describing configuration parameters and a design for at least part of an individual IP block having multiple levels of hierarchy. The data may include one or more configuration parameters for that IP block. The IP block description may be an overall functionality of that IP block such as an interconnect. The configuration parameters for the interconnect IP block may be number of address regions in the system, system addresses, how data will be routed based on system addresses, etc.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP subcomponent making up the IP block design. The abstract executable representation models TAP (timing, area and power) characteristics for each IP subcomponent and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters, The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 2010, a separate design path in an ASIC or SoC design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 2015, next, system integration may occur in the integrated circuit design process. Back-end programming generally includes programming of the physical layout of the SoC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SoC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e., a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SoC will not have any function-preventing physical defects.

In block 2020, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation test bench generator. The EDA toolset may have a disassembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an Instance in a software library callable to other programs or an EDA tool set consisting of an executable program with the software cell library in one program, stored on a machine-readable medium. A machine-readable storage medium may include any mechanism that provides (e.g., stores and/or transmits) information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The invention is not limited to the specific embodiments described above. For example, although the example embodiments all refer to FIFOs, an interconnect that calls for other types of ordered queues may also benefit from the invention. Accordingly, other embodiments are within the scope of the claims.

What is claimed is:

1. A method for operating an interconnect, comprising:
    transferring communication transaction traffic from multiple threads between a plurality of cores of an integrated circuit by buffering the communication transaction traffic using a shared storage structure in the interconnect that implements a plurality of ordered queues and an index to track which buffer entries are assigned to queues in the shared storage structure;
    guaranteeing a minimum number of buffer entries to at least a first ordered queue of the ordered queues for use by a thread that is assigned to the first ordered queue; and
    borrowing one or more buffer entries from a shared pool of uncommitted buffer entries on a first-come, first-served basis to increase a size of the first ordered queue above the guaranteed minimum number of buffer entries, and the buffer entries for at least the shared pool are tracked by the index.

2. The method of claim 1 wherein each entry in the shared pool of buffer entries is a memory block that is not statically allocated to a given ordered queue.

3. The method of claim 1 wherein the ordered queues are FIFOs.

4. A non-transitory machine-readable medium having data and instructions of an Electronic Design Automation (EDA) toolset used in a System-on-a-Chip design process stored thereon, which, when executed by a machine, cause the machine to perform the operations in claim 1.

5. The method of claim 1, wherein the shared storage structure implemented in the interconnect is a Content Addressable Memory (CAM) structure, and the interconnect includes at least one or more agent interfaces.

6. A system, comprising:
    an integrated circuit having one or more data processing elements and one or more memory storage elements;
    an interconnect to which the data processing elements are coupled, the interconnect to route communication transaction traffic between the data processing elements and the one or more memory storage elements;
    a shared storage structure implemented by the interconnect that buffers the communication transaction traffic between the one or more data processing elements and the one or more memory storage elements and the shared storage structure includes a plurality of ordered queues and an index to track which buffer entries are assigned to queues in the shared storage structure, where each data processing element may contain one or more threads, and where one or more of the ordered queues is guaranteed access to a minimum number of buffer entries that make up the queue, for use by the thread that is assigned to the queue; and
    wherein the minimum number of buffer entries that make up any one of the queues is increased above the minimum, for any of the multiple threads using the shared storage structure, by borrowing from a shared pool of unused buffer entries from one or more of the queues on a first-come, first-served basis, and the buffer entries for at least the shared pool are tracked by the index.

7. The system of claim 6, wherein the communication transaction traffic routed on the interconnect includes a plurality of requests and a plurality of responses routed between the data processing elements and the one or more memory storage elements; and the shared storage structure implemented in the interconnect is a Content Addressable Memory (CAM) structure that has the ordered queues with entries in the CAM structure and buffers at least the requests from two or more threads from the data processing elements, the responses from two or more threads from the memory storage elements, or both.

8. The system of claim 7, wherein the CAM structure comprises a plurality of CAM entries, each of the entries has a key and a data word:

the key having at least first and second fields, the first field identifies a first ordered queue through a unique thread identifier associated with a first thread, from among the plurality of ordered queues, to which its entry is currently assigned, and the second field represents how many other entries precede this entry, in queue order, for the first ordered queue; and the data word contains a portion of a buffered request or response, wherein the CAM entries are managed so that at most one of the plurality of CAM entries matches any accessed key.

9. The system of claim 8, wherein the first field identifying the first ordered queue through the unique thread identifier is static for a duration of time its CAM entry is valid, and the CAM entry becomes invalidated in response to an accessed key matching the CAM entry and its data word being output.

10. The system of claim 8, wherein the second field representing how many other entries precede this CAM entry in queue order is dynamic and changes whenever an accessed key matches an entry that precedes this CAM entry, in queue order, for the first ordered queue.

11. The system of claim 7, wherein the CAM structure comprises a plurality of CAM entries, each of the entries has a key and a data word, the key identifies an associated ordered queue and its associated thread, from among the plurality of ordered queues, and the data word contains a portion of a buffered request or response in the associated thread, and when a first CAM entry is output following a match with an input key, the first CAM entry is invalidated and becomes available for reuse by the associated ordered queue or a different ordered queue.

12. The system of claim 7, wherein a thread number is assigned to the first field when its CAM entry is written, and does not change as long as the CAM entry is in use.

13. The system of claim 7, wherein the minimum number of buffer entries in the CAM structure is a fixed number of buffer entries for each thread that is assigned to the CAM structure, and the shared pool of unused buffer entries is used on the first-come, first-served basis by any of the threads assigned to the CAM after the allotted fixed number of buffer entries assigned for that thread has been exceeded.

14. A non-transitory machine-readable medium having data and instructions of an Electronic Design Automation (EDA) toolset used in a System-on-a-Chip design process stored thereon, which, when executed by a machine, cause the machine to generate a representation of the system of claim 6.

15. The system of claim 6, wherein the shared storage comprises an asynchronous Multi-Threaded Ordered Queue (MTOQ), the MTOQ being implemented as the combination of a single-threaded asynchronous ordered queues whose read port feeds a write port of a multi-threaded synchronous ordered queue in which the plurality of multiple thread buffers are implemented using the CAM.

* * * * *